United States Patent
Camarillo et al.

(10) Patent No.: US 7,085,585 B2
(45) Date of Patent: Aug. 1, 2006

(54) SYSTEM AND METHOD FOR VIBRATING A PORTABLE DEVICE

(75) Inventors: Richard J. Camarillo, San Diego, CA (US); Mark Edward Simek, San Diego, CA (US)

(73) Assignee: Kyocera Wireless Corp., San Diego, CA (US)

( * ) Notice: Subject to any disclaimer, the term of this patent is extended or adjusted under 35 U.S.C. 154(b) by 424 days.

(21) Appl. No.: 10/404,688

(22) Filed: Mar. 31, 2003

(65) Prior Publication Data

US 2004/0192374 A1    Sep. 30, 2004

(51) Int. Cl.
*H04B 1/38* (2006.01)
(52) U.S. Cl. .................. 455/550.1; 455/567; 455/90.1
(58) Field of Classification Search ............. 455/550.1, 455/567, 90.1, 575.1, 347; 340/7.6, 407.1, 340/391.1, 398.2, 398.1; 434/113, 116
See application file for complete search history.

(56) References Cited

U.S. PATENT DOCUMENTS 5,436,622 A * 7/1995 Gutman et al. ............. 340/7.6
6,323,758 B1 * 11/2001 Morita ..................... 340/407.1
6,389,302 B1 * 5/2002 Vance ........................ 455/567

* cited by examiner

Primary Examiner—Lester G. Kincaid
Assistant Examiner—Larry Hannif-Ali

(57) ABSTRACT

A system and a method are provided for vibrating a portable device. The system includes a vibrator housing with stops, a vibrator circuit, and a controller. The controller has an output to supply alternating electric current. The vibrator circuit includes a vibrator coil and a magnetic vibrator rod. The vibrator coil is made of a conductive material and has an inside core space and inputs to accept the alternating electric current. The vibrator coil generates an alternating magnetic field through the core space in response to the alternating electric current and the vibrator rod moves in a reciprocating linear fashion in the core space in response to the alternating magnetic field. The vibrator rod has ends with audio damping pads impacting against stops in the vibrator housing. The vibrator housing vibrates in response to the vibrator rod impacting against the stops. The controller has an input for selecting frequency commands in response to predetermined portable device conditions and supplies electric current alternating at a frequency responsive to the commands. In one aspect, the portable device is a wireless communications device and the controller selects commands in response to received calls from calling telephone numbers.

24 Claims, 3 Drawing Sheets

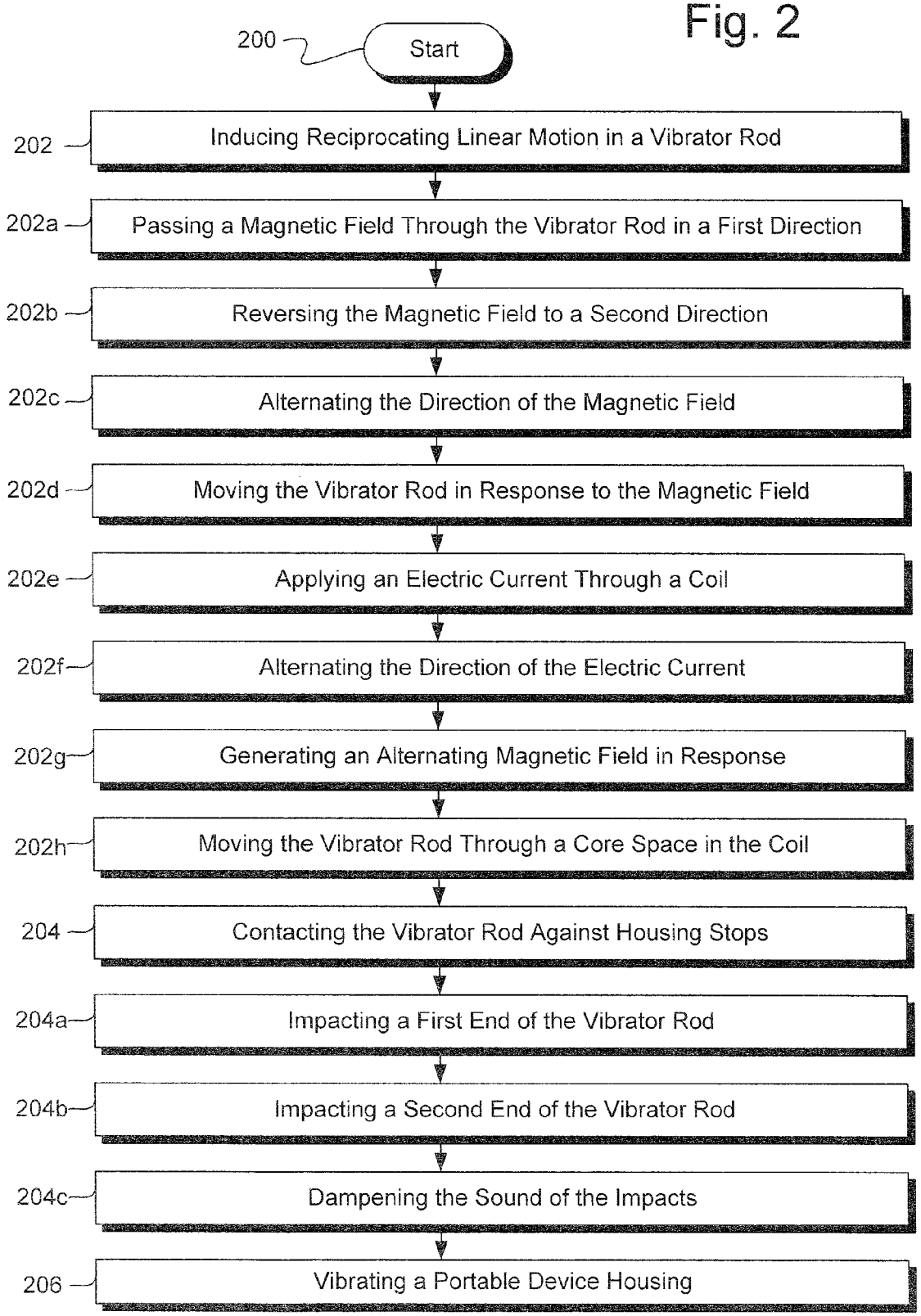

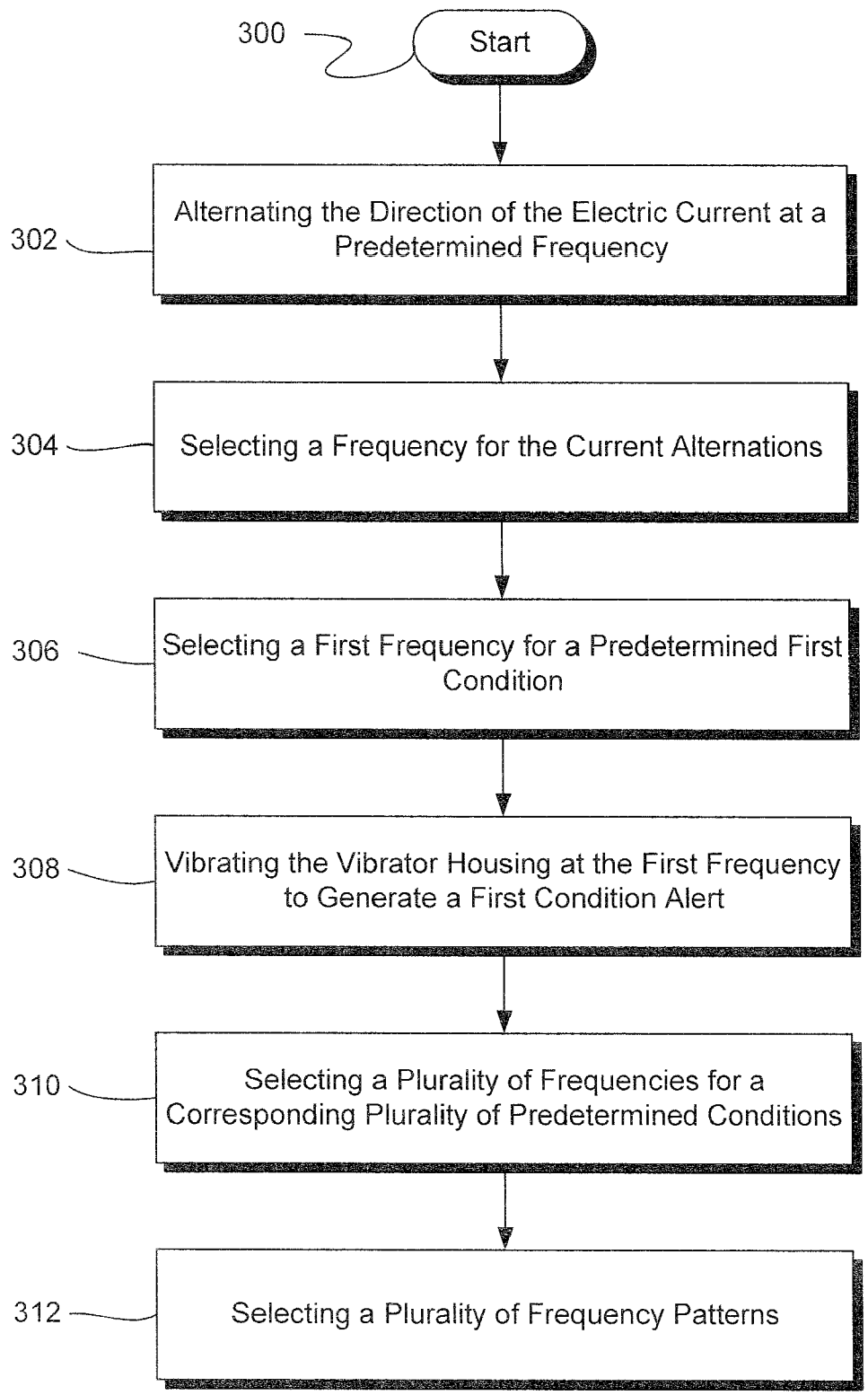

SYSTEM AND METHOD FOR VIBRATING A PORTABLE DEVICE

BACKGROUND OF THE INVENTION

1. Field of the Invention

This invention generally relates to portable device alert mechanisms and, more particularly, to a linear reciprocal system and method for vibrating a portable device.

2. Description of the Related Art

Typically, vibrations are produced in a portable device to alert the device user of a predetermined condition. For example, in a wireless communications device, the device may be vibrated to alert the user of an incoming telephone call. Vibratory alerts can be used in situations in which an audible alert, such as a ringer, is undesirable or inappropriate. For example, at a concert or a quiet social gathering, an audible ringer would be an unwelcome disturbance.

Conventionally, vibrations in portable devices are produced by an electric motor mounted to the device housing on rubber pads (or other materials having sound dampening qualities). An off-set pendulum weight is attached to the motor shaft, and as the shaft rotates, it sets up an imbalance on the shaft, causing the motor to vibrate. The vibrations of the motor are transferred to the housing via the mounting pads.

There are several disadvantages associated with the conventional vibrating system described above. A wireless communications device is used as an example to illustrate these disadvantages. However, it should be appreciated that these disadvantages apply to other portable devices as well. Advances in technology and manufacturing techniques are resulting in increasingly smaller wireless communications devices, which in turn, have created increasing demands to reduce the size of components used in the devices and to vary the configuration of these components to more efficiently use the space available inside the portable devices. Unfortunately, the motors used in the conventional systems are relatively large and the basic shape of the motors cannot be altered to any great degree. Therefore, the size and inflexibility in the configurability of the motors in the conventional system are obstacles to reducing the size of wireless devices, or may result in the loss of space inside wireless devices for other components.

The trend toward smaller wireless devices along with increases in wireless device functions results in an increase in battery power requirements exacerbated by efforts to reduce battery size. Therefore, minimizing energy consumption in the wireless device is extremely important. Unfortunately, the conventional system includes additional energy consumption in the form of motor bearing losses. Finally, the conventional system creates undesirable audible noise caused by the vibration of the motor and the interaction of the motor and the wireless device housing. Although intended as a silent alarm, vibrators are seldom completely silent.

It would be advantageous if a portable device could be vibrated by a system that was small in size, could be flexibly configured, minimized energy consumption, and did not produce audible noise.

SUMMARY OF THE INVENTION

The present invention addresses the problem of vibrating a portable device. The invention recognizes that space and battery capacity are limited in portable devices and that audible noise associated with vibrating the portable device may be undesirable. The invention addresses this problem by inducing linear reciprocating motion in a vibrator rod using alternating electric current to create an alternating magnetic field in a coil. The impaction of the rod against a portable device housing creates a vibration.

Accordingly, a system is provided for vibrating a portable device. The system includes a vibrator housing with stops, a vibrator circuit, and a controller. The controller has an output to supply alternating electric current. The vibrator circuit includes a vibrator coil and a magnetic vibrator rod. The vibrator coil is made of a conductive material and has an inside core space and inputs to accept the alternating electric current. The vibrator coil generates an alternating magnetic field through the core space in response to the alternating electric current. The vibrator rod moves in a reciprocating linear fashion in the core space in response to the alternating magnetic field. The vibrator rod has ends with audio damping pads impacting against stops in the vibrator housing. The vibrator housing vibrates in response to the vibrator rod impacting against the stops. The controller has an input for selecting frequency commands in response to predetermined portable device conditions and supplies electric current alternating at a frequency responsive to the commands. In one aspect, the portable device is a wireless communications device and the controller selects commands in response to received calls from calling telephone numbers.

Additional details of the above-described system, and a method for vibrating a portable device are provided below.

BRIEF DESCRIPTION OF THE DRAWINGS

FIG. 2 is a flowchart illustrating the method for vibrating a portable device in accordance with the present invention.

FIG. 3 is a flowchart showing in further detail the method illustrated in FIG. 2.

DETAILED DESCRIPTION OF THE PREFERRED EMBODIMENTS

Figure 1:
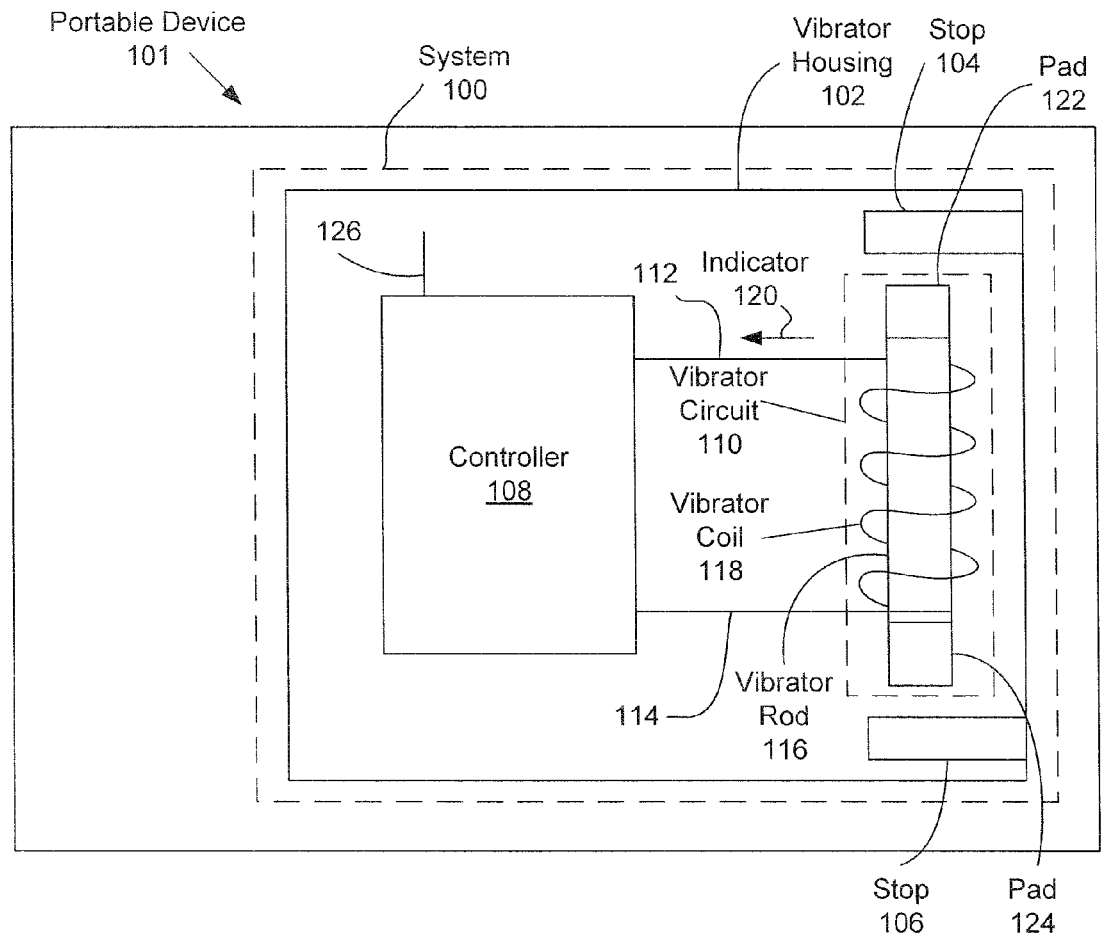
FIG. 1 is a schematic block diagram depicting the system for vibrating a portable device in accordance with the present invention.

FIG. 1 is a schematic block diagram depicting the system 100 for vibrating a portable device in accordance with the present invention. The system 100 includes a portable device 101, a vibrator housing 102 with stops 104 and 106, a controller 108, and a vibrator circuit 110. The controller 108 has outputs to provide alternating electrical current on lines 112 and 114. The vibrator circuit 110 includes a magnetic vibrator rod 116 and a vibrator coil 118. The coil 118 has inputs on lines 112 and 114 to accept the alternating current from the controller 108 and generates an alternating magnetic field in response to the alternating electric current. The vibrator rod 116 moves in a reciprocating linear fashion contacting the stops 104 and 106, as explained below, in response to the alternating magnetic field.

As noted in the Background, advances in technology and manufacturing techniques are resulting in increasingly smaller portable devices, such as wireless communications devices, which in turn, have created increasing demands to reduce the size of components used in the devices and to vary the configuration of these components to more efficiently use the space available inside the portable devices. The system 100 can be sized and configured to fit the amount and shape of the space available in a portable device. The controller 108 is not integral to the vibrator coil 116 and can be placed virtually anywhere within a portable device. The function of the vibrator circuit 110 is relatively independent of the shape of the vibrator coil 118 and the vibrator rod 116, provided the vibrator coil produces a magnetic field sufficient for moving the vibrator rod 116. For example, the vibrator coil 118 and the vibrator rod 116 can be made long and narrow to fit a long narrow space inside the portable device.

The vibrator coil 118 is constructed of an electrically conductive material, such as copper, and has an inside core space. The vibrator rod 116 is placed inside the core space. When the controller 108 provides electric current in the direction shown by indicator 120, the flow of the current in the coil 118 generates a magnetic field (not shown) through the core space of coil 118 and through vibrator rod 116. The direction of the magnetic field or flux can be determined by the "Right-Handed-Screw-Rule". In this case, the direction of the field will be toward stop 104. The vibrator rod 116 is magnetized to enable the vibrator rod 116 to move in response to the magnetic field lines through the core space in the coil 118. That is, the magnet or magnets (not shown) in vibrator rod 116 move either by attraction to or repulsion from the magnetic field in the core space, causing the vibrator rod 116 to move. The controller 108 reverses the flow of the electric current to the coil 118 after a predetermined period of time. As the current flows opposite the direction shown by indicator 120, the direction of the magnetic field in the vibrator coil 118 core space reverses toward stop 106 in response, causing the rod 116 to move in the opposite direction. The controller 108 continues to alternate the direction of the electric current, causing the magnetic field in the vibrator coil 118 and the direction of movement for vibrator rod 116 to also continue alternating.

For this discussion, it is assumed that the orientation of the magnet or magnets in the vibrator rod 116 causes the vibrator rod 116 to move toward stop 104 when the current is flowing as shown by indicator 120. When the current is flowing as shown by indicator 120, the vibrator rod 116 moves until it impacts against stop 104, causing a vibration in the stop 104 that is transferred to the vibrator housing 102. When the direction of the electric current is reversed as discussed above, the vibrator rod 116 travels toward stop 106 until the vibrator rod 116 impacts the stop 106. Since the magnetic field lines through the core space of the vibrator coil 118 are relatively straight, the magnetic field lines induce a linear, reciprocating movement in the vibrator rod 116 between the limits of that movement, stops 104 and 106. That is, the long axis of the vibrator rod 116 travels in an approximately straight line between the stops 104 and 106. Hence, the system 100 can be called a linear vibrator. The operation of the coil 116 and the vibrator rod 118 in the vibrator circuit 110 is inherently quiet. However, to eliminate objectionable audible noise caused by the ends of the vibrator rod 116 impacting the stops 104 and 106, either the ends of the vibrator rod 116 or the stops 104 and 106 are equipped with sound-dampening or audio-dampening pads. FIG. 1 shows pads 122 and 124 on the ends of the vibrator rod 116. The stops 104 and 106 are not necessarily protrusions or extensions of the vibrator housing 102. The stops 104 and 106 can be points on the surface of the vibrator housing 102 impacted by the vibrator rod 116 (not shown).

As noted above, the controller 108 continues to alternate the direction of the electric current on lines 112 and 114 at predetermined time intervals. That is, the controller 108 alternates the electric current at a predetermined frequency. The controller 108 has an input on line 126 for accepting electric current frequency commands and the controller 108 supplies electric current responsive to the frequency commands. The controller 108 accepts frequency commands in response to predetermined portable device 101 conditions. That is, the system 100 vibrates the portable device 101 in response to commands that the controller 108 receives regarding predetermined conditions associated with the portable device. These predetermined conditions can be alerts regarding status or routine operation of the portable device 101 or alarms regarding problems with the portable device. For example, the alerts can be reminders that routine maintenance is due on the portable device 101 or that the portable device 101 has completed an assigned operation.

In one aspect of the system, the controller 108 supplies electric current at a particular frequency in response to a particular predetermined condition. In another aspect of the system, the controller 108 supplies electric current at a plurality of frequencies corresponding to a plurality of predetermined conditions. That is, each frequency corresponds to a particular predetermined condition in the portable device. The device user perceives the differences in the frequencies as differences in the rate at which the device vibrates. This aspect of the system enables the device user to code the various alerts and to be able to determine the level of response necessary to the alerts without disrupting the device user's on-going activities. For example, a device user in a movie theater could judge whether an alert needed immediate attention, which might necessitate leaving the theater, or whether the alert condition can be neglected for a period of time, allowing the device user to finish viewing the movie.

In one aspect of the system, the controller 108 supplies electric current at a plurality of frequency patterns corresponding to a plurality of predetermined conditions. These patterns can be continuous or intermittent in nature. An example of a continuous pattern would be supplying a first frequency for one second, supplying a second frequency for two seconds, and repeating the pattern without a break between frequency segments. An example of an intermittent pattern would be supplying a first frequency for one second, supplying no frequency for one second, and repeating the pattern. The alerts supplied by this aspect could be likened to a simplified tactile Morse Code. It may be easier for the portable device user to differentiate among alerts consisting of vibration patterns than among alerts consisting of vibrations at a single, continuous frequency.

In one aspect of the system, the portable device 101 is a wireless communications device and the wireless device accepts frequency commands in response to the wireless device receiving telephone calls. In another aspect of the system, the portable device 101 is a wireless communications device and the controller supplies electric current at a particular frequency in response to a received call from a particular telephone number.

In one aspect of the system, the portable device 101 is a wireless communications device and the controller 108 supplies electric current at a plurality of frequencies corresponding to calls received from a plurality of predetermined telephone numbers. That is, each frequency corresponds to a particular predetermined telephone number or group of telephone numbers. As discussed above, this aspect allows the wireless device user to code the alerts. That is, the wireless device user is able to identify received calls and determine the proper responses to those calls.

In another aspect of the system, the portable device 101 is a wireless communications device and the controller 108 supplies electric current at a plurality of frequency patterns corresponding to calls received from a plurality of predetermined telephone numbers. For example, one frequency pattern could be assigned to telephone calls received from a wireless device user's home telephone, a second frequency pattern could be assigned to telephone calls received from any one of the three telephone numbers at the user's work office, and a third frequency pattern could be assigned to telephone calls received from any other telephone numbers.

FIG. 2 is a flowchart illustrating the method for vibrating a portable device in accordance with the present invention. Although the method in FIG. 2 (and FIG. 3 below) is depicted as a sequence of numbered steps for clarity, no order should be inferred from the numbering unless explicitly stated. The method starts at Step 200. Step 202 induces reciprocating linear movement in a vibrator rod. Step 202a passes a magnetic field through the vibrator rod in a first direction, the vibrator rod including a magnet. Step 202b reverses the magnetic field to a second direction. Step 202c alternates the direction of the magnetic field between the first and second directions. Step 202d moves the vibrator rod in response to alternating the magnetic field. Step 202e applies an electric current through a coil. Step 202f alternates the direction of the electric current. Step 202g generates an alternating magnetic field in response to the alternating electric current. Step 202h moves the vibrator rod through a core space inside the coil. Step 204 contacts the vibrator rod against housing stops. Step 204a impacts a first end of the vibrator rod against a first stop forming the limit of movement of the rod in a first direction. Step 204b impacts a second end of the vibrator rod against a second stop forming the limit of movement in a second linear direction opposite the first direction. Step 204c dampens the sound of the impacts. Step 206 vibrates a portable device housing.

FIG. 3 is a flowchart showing in further detail the method illustrated in FIG. 2. The method starts at Step 300. Step 302 alternates the direction of the electric current at a predetermined frequency. Step 304 selects a frequency for the current alternations. Step 306 selects a first frequency for a predetermined first condition. Step 308 vibrates the vibrator housing at the first frequency to generate a first condition alert. Step 310 selects a plurality of frequencies for a corresponding plurality of predetermined conditions. Step 312 selects a plurality of frequency patterns.

In one aspect of the method, the portable device is a wireless communications device. Then, vibrating the vibrator housing at the first frequency to generate a first condition alert in Step 308 includes vibrating in response to receiving telephone calls. Selecting a frequency for the current alternations in Step 304 includes selecting a first frequency corresponding to received calls from a first predetermined calling telephone number. In other aspects, selecting a frequency for the current alternations in Step 304 includes selecting a plurality of frequencies corresponding to received telephone calls from a corresponding plurality of calling telephone numbers and selecting a plurality of frequency patterns corresponding to received telephone calls from a corresponding plurality of calling telephone numbers.

A system and a method are provided for vibrating a portable device. Examples of the present invention have been enabled with wireless communications devices. However, it should be understood that the present invention is not limited to any particular portable device. The present invention system and method are applicable to a wide range of portable devices, including lap top computers, personal digital assistants, remote controllers, and pagers. Other variations and embodiments of the present invention will occur to those skilled in the art.

We claim:

1. A method for vibrating a portable device, the method comprising:
   inducing reciprocating linear movement in a vibrator rod, the vibrator rod including a magnet, the inducing reciprocating linear movement in a vibrator rod further including:
      applying an electric current through a coil;
      alternating the direction of the electric current;
      passing a magnetic field through the vibrator rod in a first direction by generating an alternating magnetic field in response to the alternating electric current;
      reversing the magnetic field to a second direction;
      alternating the direction of the magnetic field between the first and second directions; and
      moving the vibrator rod through a core space inside the coil in response to alternating the magnetic field;
   contacting the vibrator rod against housing stops by
      impacting a first end of the vibrator rod against a first stop forming the limit of movement of the rod in a first direction; and
      impacting a second end of the vibrator rod against a second stop forming the limit of movement in a second linear direction opposite the first direction; and
   vibrating a portable device housing.

2. The method of claim 1 wherein alternating the direction of the electric current includes alternating the direction at a predetermined frequency.

3. The method of claim 2 wherein impacting a first end of the vibrator rod against a first stop and impacting a second end of the vibrator rod against a second stop includes dampening the sound of the impacts.

4. The method of claim 2 further comprising: selecting a frequency for the current alternations.

5. The method of claim 4 wherein selecting a frequency includes selecting a first frequency for a predetermined first condition; and,
   wherein vibrating the portable device housing includes vibrating at the first frequency to generate a first condition alert.

6. The method of claim 5 wherein selecting a frequency includes selecting a plurality of frequencies for a corresponding plurality of predetermined conditions.

7. The method of claim 6 wherein selecting a plurality of frequencies includes selecting a plurality of frequency patterns.

8. The method of claim 5 in which the portable device is a wireless communications device; and,
   wherein vibrating the portable device housing includes vibrating in response to receiving telephone calls.

9. The method of claim 8 wherein selecting a frequency includes selecting a first frequency corresponding to received telephone calls from a first predetermined calling telephone number.

10. The method of claim 8 wherein selecting a frequency includes selecting a plurality of frequencies corresponding to received calls from a corresponding plurality of predetermined calling telephone numbers.

11. The method of claim 10 wherein selecting a plurality of frequencies includes selecting a plurality of frequency patterns.

12. A system for vibrating a portable device, the system comprising:

a vibrator housing with stops including a first stop and a second stop;
a controller having an output to supply alternating electric current; and
a vibrator circuit including:
   a vibrator coil formed of an electrically conductive material with an inside core space and having an input to accept the alternating electric current and generating an alternating magnetic field in response; and
   a magnetic vibrator rod moving in a reciprocating linear fashion in the magnetic field, magnetic vibrator rod further including a first end impacting against the first stop, forming the limit of movement of the vibrator rod in a first direction, and a second end impacting against the second stop, forming the limit of movement in a second linear direction opposite the first direction, wherein the vibrator coil is structured and configured to:
      generate a magnetic field through the magnetic vibrator rod in a first direction;
      reverse the magnetic field to a second direction; and
      alternate the direction of the magnetic field between the first and second directions, wherein the magnetic vibrator rod moves inside the core space in response to the alternating magnetic field;
   wherein the vibrator housing vibrates in response to the vibrator rod impacting against the stops.

13. The system of claim 12 wherein the controller has an input for accepting electric current frequency commands, and wherein the controller supplies electric current alternating at a frequency responsive to the frequency commands.

14. The system of claim 13 wherein the controller accepts frequency commands in response to predetermined portable device conditions.

15. The system of claim 14 wherein the magnetic vibrator rod has audio damping pads installed on the first and second ends.

16. The system of claim 14 wherein the vibrator housing includes audio damping pads installed on the first and second stops.

17. The system of claim 15 wherein the controller accepts commands for a first frequency corresponding to a first predetermined condition.

18. The system of claim 15 wherein the controller accepts commands for a plurality of frequencies corresponding to a plurality of predetermined conditions.

19. The system of claim 18 wherein the controller accepts commands for a plurality of frequency patterns.

20. The system of claim 15 in which the portable device is a wireless communications device; and,
   wherein the controller accepts frequency commands in response to received calls from calling telephone numbers.

21. The system of claim 20 wherein the controller accepts commands for a first frequency in response to received calls from a first predetermined calling telephone number.

22. The system of claim 20 wherein the controller accepts commands for a plurality of frequencies in response to received calls from a corresponding plurality of predetermined calling telephone numbers.

23. The system of claim 22 wherein the controller accepts commands for a plurality of frequency patterns.

24. A system for vibrating a wireless communications device, the system comprising:
   a vibrator housing with stops, a vibrator circuit with a vibrator coil and a vibrator rod, and a controller; and,
   wherein the controller has an input to accept frequency commands in response to received calls from calling telephone numbers and an output to supply electric current alternating at a predetermined frequency in response to frequency commands;
   wherein the vibrator coil is formed of an electrically conductive material with an inside core space, has an input to accept the electric current from the controller, and generates an alternating magnetic field in response to the electric current;
   wherein the magnetic vibrator rod moves in a reciprocating linear fashion inside the core space in response to the alternating magnetic field and impacts against the vibrator housing stops; and,
   wherein the vibrator housing vibrates.

* * * * *

UNITED STATES PATENT AND TRADEMARK OFFICE
CERTIFICATE OF CORRECTION

| | |
|---|---|
| PATENT NO. | : 7,085,585 B2 |
| APPLICATION NO. | : 10/404688 |
| DATED | : August 1, 2006 |
| INVENTOR(S) | : Richard J. Camarillo, Mark Edward Simek and Wade L. Heimbigner |

It is certified that error appears in the above-identified patent and that said Letters Patent is hereby corrected as shown below:

Title page, Item (75) should read:

-- (75) Inventors: Richard J. Camarillo, San Diego, CA (US); Mark Edward Simek, San Diego, CA (US); Wade L. Heimbigner, San Diego, CA (US) --

Signed and Sealed this

Thirty-first Day of July, 2007

JON W. DUDAS
*Director of the United States Patent and Trademark Office*